(12) United States Patent
Gregory et al.

(10) Patent No.: US 8,657,235 B2
(45) Date of Patent: Feb. 25, 2014

(54) SPACE DEBRIS REMOVAL USING UPPER ATMOSPHERE AND VORTEX GENERATOR

(75) Inventors: Daniel Alan Gregory, Potomac Falls, VA (US); John-Francis Mergen, Baltimore, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 260 days.

(21) Appl. No.: 12/986,346

(22) Filed: Jan. 7, 2011

(65) Prior Publication Data
US 2012/0175466 A1    Jul. 12, 2012

(51) Int. Cl.
  B64G 1/56  (2006.01)
  B64B 1/00  (2006.01)
  F42B 99/00  (2006.01)
  F41H 11/00  (2006.01)

(52) U.S. Cl.
  USPC ............ 244/158.4; 244/30; 102/293; 42/106; 89/1.11

(58) Field of Classification Search
  USPC ............... 244/158.1, 158.4, 2, 63, 24, 30, 31; 102/293; 42/106; 89/1.11
  See application file for complete search history.

(56) References Cited

U.S. PATENT DOCUMENTS

| | | | |
|---|---|---|---|
| 3,940,060 A * | 2/1976 | Viets | 239/14.1 |
| 4,421,204 A * | 12/1983 | Lawrence | 244/31 |
| 5,115,997 A * | 5/1992 | Peterson | 244/25 |
| 5,405,108 A | 4/1995 | Marin et al. | |
| 6,213,024 B1 * | 4/2001 | Jasper et al. | 102/502 |
| 6,544,347 B2 * | 4/2003 | Lucey et al. | 134/34 |
| 6,609,945 B2 * | 8/2003 | Jimenez et al. | 244/30 |
| 7,131,613 B2 * | 11/2006 | Kelly | 244/171.4 |
| 7,191,774 B2 * | 3/2007 | Thorne | 124/55 |
| 7,317,662 B2 * | 1/2008 | Unsworth et al. | 367/144 |
| 7,341,224 B1 * | 3/2008 | Osann, Jr. | 244/30 |

(Continued)

FOREIGN PATENT DOCUMENTS

| | | | |
|---|---|---|---|
| RU | 2204508 | 5/2003 | |
| WO | WO9909355 | * 2/1999 | F23R 7/00 |

OTHER PUBLICATIONS

Global Aerospace Corporation, "Gossamer Orbit Lowering Device (GOLD) for Low-risk Satellite De-orbit," http://www.gaerospace.com/projects/GOLD/index.html, retrieved Jan. 6, 2011, 2 pages.

(Continued)

Primary Examiner — Joseph W Sanderson
Assistant Examiner — Marc Burgess
(74) Attorney, Agent, or Firm — Ropes & Gray LLP

(57) ABSTRACT

The systems and methods of the invention modulate atmospheric gases to temporarily increase the amount of atmospheric particles in the path of the debris, in order to decelerate the debris and accelerate natural orbital decay to the point of atmospheric re-entry. In one aspect of the invention, clearing the space debris includes propelling a plume of atmospheric gases substantially orthogonal to the path of the debris such that the debris collides with the gaseous plume as it passes through the plume. Increased atmospheric drag from the gaseous particles of the plume in the path of the debris obstructs a forward propagation of the debris and gradually decelerates the debris, leading eventually to atmospheric recapture. Embodiments of the invention can be employed in any number of applications, including without limitation, clearing debris in the low-earth orbit (LEO) which is particularly susceptible to debris build-up, de-orbiting non-refuse payloads from orbits, and clearing debris from geosynchronous orbits.

9 Claims, 5 Drawing Sheets

(56) References Cited

U.S. PATENT DOCUMENTS

| | | | |
|---|---|---|---|
| 8,173,946 B1* | 5/2012 | Patterson et al. | 244/3.15 |
| 2006/0071121 A1* | 4/2006 | Wescott et al. | 244/17.11 |
| 2007/0261438 A1* | 11/2007 | Ezaka et al. | 62/643 |
| 2007/0285304 A1 | 12/2007 | Cooper | |
| 2008/0087771 A1* | 4/2008 | Boespflug et al. | 244/207 |
| 2009/0255999 A1* | 10/2009 | Jenkins | 239/14.1 |
| 2010/0230531 A1* | 9/2010 | Fayed et al. | 244/30 |

OTHER PUBLICATIONS

Schall, "Laser Radiation for Cleaning Space Debris from Lower Earth Orbits," DLR, German Aerospace Center, D-70503 Stuttgart, Germany, Journal of Spacecraft and Rockets, vol. 39 No. 1, Jan.-Feb. 2002, (1 page, 81).

Marti-Marques, "Space Debric Remover at GEO orbit," IAC-04-IAA.5.P.04, Polytechnic University of Valencia, 55th International Astronautical Congress 2004—Vancouver, Canada (1 pg.).

Uchida et al., "Characterization of Brillouin-Enhanced Four-Wave Mixing for an Application to Space Debris Removal," Institute for Laser Technology, Downloaded from SPIE Digital Library on Jan. 7, 2011 (8 pages, 68-75).

Uchida et al., "Study on Momentum Coupling Efficiency of Laser Ablation for Space Debris Removal," Institute for Laser Technology, Downloaded from SPIE Digital Library on Jan. 7, 2011 (8 pages, 65-71).

Michaels, "A Cosmic Question: How to Get Rid of All that Orbiting Space Junk—WSJ.com," http://online.wsj.com/article/SB123672891900989069.html. Jan. 6, 2011.

Fork, "Orbital Debris Mitigation Using Minimum Uncertainty Optical States," Proceedings of the IEEE, vol. 97, No. 6, Jun. 2009.

Campbell et al., "Orbital Debris Removal and Meteroid Deflection," Downloaded from SPIE Digital Library on Jan. 7, 2011 (pp. 101-112).

Campbell, "Power Beaming for Orbital Debris Removal," Downloaded from SPIE Digital Library on Jan. 7, 2011 (pp. 583-589).

Schall, "Removal of Small Space Debris with Orbiting Lasers," DLR (German Aerospace Center), Downloaded from SPIE Digital Library on Jan. 7, 2011(pp. 564-574).

Bennett, "Segmented Adaptive Optic Mirrors for Laser Power Beaming and Other Space Applications," SPIE vol. 2714, Downloaded from SPIE Digital Library on Jan. 7, 2011 (pp. 240-259).

International Search Report and Written Opinion of the International Searching Authority of Application No. PCT/US2011/065223 mailed Apr. 13, 2012.

Database WPI Week 20D344 Thomson Scientific, London, GB; AN 20D3-464872, XP0D2673370 dated May 4, 2012 (1 page).

* cited by examiner

SPACE DEBRIS REMOVAL USING UPPER ATMOSPHERE AND VORTEX GENERATOR

TECHNICAL FIELD

This invention relates to the clearing of a region of space, and is particularly suitable for the removal of space debris and other unwanted objects in space.

BACKGROUND

Accumulation of space debris is a growing problem in many orbital regimes and poses a hazard to space vehicles. Space debris (also known as "orbital debris," "space junk," or "space waste") includes the collection of objects, such as spent rocket stages, defunct satellites, explosion fragments, and collision fragments, in orbit around Earth which were created by space traffic but no longer serve any useful purpose. This debris poses a potential collision risk for operational space vehicles because the orbits of the debris often overlap with the trajectories of spacecraft. The risk of collision is increased in the low earth orbit (LEO), partly due to the combined effect of high operational traffic in the LEO, and the natural slow gravitational decay process which brings near-orbit debris "home" to the LEO.

Scientists have explored a number of techniques to clear debris from space, among them natural decay, debris grabbers, transfer to a dump orbit, and space sweepers. Natural gravitational decay takes a long time to decrease the orbital velocity of debris to the point of re-entry and is ineffective in the face of rapid build-up. Debris grabbers, which typically involve using a tethered grappling unit having robotic arms to envelop and retrieve target debris, require tremendous fuel consumption and also require the development of sensor systems to detect and trace debris. Transferring to a dump orbit raises difficult questions about appropriate dump sites. Other methods, involving use of tethers to bleed energy through induced currents, aero shields, or using an aerogel of compressed gas from cylinders to provide a retrograde drag, are inadequate because they are highly energy-intensive and require the lofting of mass into an orbit aligned with the targeted space debris.

SUMMARY

Accordingly, systems and methods for clearing space debris that are cost-effective and energy-efficient are desirable. It is also desirable that such systems and methods be capable of clearing debris without requiring complex orbit-matching or debris-tracking technology, or introducing more debris into orbits.

This invention relates to systems and methods for clearing objects, especially space debris, from space. As used herein, "space debris" (also known sometimes as "orbital debris," "space junk," or "space waste") includes various by-products in orbit around the earth created by space traffic, such as, without limitation, spent rocket stages, defunct satellites, explosion fragments, and collision fragments. Space debris may also include naturally occurring components such as chunks of rock and ice. For ease of description and simplicity, the invention will be described for the specific application of clearing space debris from a low-earth orbit (LEO), which includes orbits within the locus extending from the Earth's surface up to an altitude of about 1300 miles. However, embodiments can be employed to clear other objects (such as to de-orbit non-refuse payloads from near low earth orbits), and in orbits other than a LEO (such as mid earth orbits or geosynchronous orbits), without departing from the principles of the invention.

The systems and methods described herein modulate atmospheric gases to temporarily increase the amount of atmospheric particles in the path of the orbiting debris, in order to decelerate the debris and accelerate natural orbital decay to the point of atmospheric re-entry. In one aspect of the invention, clearing the space debris includes artificially propelling a plume of atmospheric gases substantially orthogonally into the path of the debris or into a debris field. Introduction of the gaseous particles into the debris path increases the atmospheric resistance or drag through which the debris passes, so as to gradually decelerate objects that pass through the plume. Because the orbit in which a particle of debris travels is generally intimately linked to the orbital velocity of the particle, even a small decrease in velocity caused by the increase in atmospheric particles in the path of the debris can be sufficient to cause the debris to switch into a lower orbit and eventually lead to atmospheric recapture of the debris. Embodiments of the invention can be employed in any number of applications, including without limitation, clearing debris in the low-earth orbit (LEO) which is particularly susceptible to debris build-up, de-orbiting non-refuse payloads from orbits, and clearing debris from geosynchronous orbits.

According to a first aspect, a method for clearing space debris from an earth orbit includes dispersing a gaseous explosive to form a shaped charge for directing a gaseous plume substantially orthogonal to a path of the space debris. The method also includes triggering an explosion of the shaped charge, thereby causing the gaseous plume to be injected in the path of the space debris so as to decrease an orbital velocity of the space debris and cause the debris to re-enter the earth's atmosphere. As used herein, a gaseous plume refers to a volume of gaseous substances or particles, generally compressed air, moving upward toward space.

In an embodiment, the gaseous explosive includes a fuel-air explosive. In one embodiment, the gaseous explosive includes Hydrogen gases collected in the stratosphere using a solar-powered harvesting device. In an embodiment, a dispersing device disperses the gaseous explosive at an operational altitude that is less than the altitude of the target orbit, so that clearing of the debris can occur without lofting the gaseous explosive into space. The operational altitude can be any "suborbital" altitude. As used herein, a suborbital altitude refers to an altitude that is less than the altitude of any orbit, so that objects propelled to that altitude return to ground without reaching escape velocity. For example, the dispersing device would typically disperse the gaseous explosive at an altitude of about 20 to 25 miles above ground, although altitudes of 10 to 50 miles above ground are also possible for certain configurations. The shaped charge can take any suitable form, including, without limitation, a dome-shaped form having curved surface that faces away from the earth, or a donut-shaped ring.

In an embodiment, a control module times a trigger of the explosion of the shaped charge relative to the location of the target debris such that the debris collides with the gaseous plume. As used herein, a "module" includes any combination of software, hardware, firmware, or computer-readable medium storing computer executable instructions for causing a processor to carry out steps defined by those instructions. In an embodiment, the gaseous plume is configured such that the gaseous particles remain in the path of the space debris for a finite period of time so as to cause deceleration of a target volume of space debris passing through the gaseous plume during the finite period of time. The finite period of time can range anywhere from less than a few seconds to a few minutes depending on, for example, the debris density of the targeted field, the size of the debris particles to be cleared, and the orbital velocity of the debris.

According to a second aspect of the invention, a system for clearing space debris from an earth orbit includes a vortex generator for propelling a vortex of gaseous plume into a path of space debris, thereby causing the gaseous plume to be injected in the path of the space debris to clear the space debris. As used herein, a vortex refers to a spinning, a spiraling, or a whirling flow of fluid around a center of rotation. In one embodiment, the fluid includes particles of atmospheric gases. The whirling or spinning air mass can take various forms including, without limitation, the form of a helix, a column, or a spiral. A vortex is generally, though not necessarily, created by expelling the fluid through a small opening which may be produced either physically or through the action of a shaped explosion within a vortex generator. Because of the manner in which the fluid rotates (i.e., to conserve initial vorticity), a vortex can propagate for a relatively long distance before being dissipated by drag within the travel medium. In one embodiment, the vortex is generated by propelling compressed air through an opening in an appropriately-shaped form, such as an open-ended cone. In a second embodiment, the vortex is generated by triggering an explosion beneath an opening in the shaped structure.

In one aspect of the invention, a vortex generator generates a vortex ring, typically using acetylene-air or hydrogen-oxygen explosions, for propelling the gaseous plume. The system includes a floating platform (e.g., a high-altitude balloon) for maintaining the vortex generator at an operational altitude above ground, and a targeting device for aiming the vortex generator substantially orthogonally to the path of the space debris. As noted above, the operational altitude can be any suitable suborbital altitude, and is typically selected to reduce atmospheric drag on the vortex. In one embodiment, the vortex generator is a high-powered vortex ring gun configured to cause the gaseous plume to penetrate the mesosphere and enter into the thermosphere. In one embodiment, the vortex generator is powered by triggering an explosion of an explosive charge. The gases that are propelled to activate the vortex can be collected from the stratosphere.

In the above-described embodiments, the decrease in velocity of the debris is caused primarily by increasing the amount of atmospheric particles that obstruct the debris path. Therefore, to be effective, the plume need only be injected with enough energy to merely place a sufficient mass of the gaseous particles in front of the debris. This use of atmosphere modulation, as opposed to e.g., direct impulse or direct force from an in-orbit explosion, can result in further reductions in energy consumption since the plume only need be propelled with enough energy to reach its target height in order to be effective. In other embodiments, the plume can be configured with sufficient energy such that it reaches the target orbit with sufficient left-over energy to impart an impulse to debris that collides with the plume.

Embodiments of the invention also provide further advantages. For example, use of atmospheric gas that is already present in the upper reaches of the atmosphere avoids the cost of lofting the necessary mass to propel into the orbit. Since no charge mass is lifted into orbit, there is no possibility of generating additional debris when using the debris clearing systems and methods of the present invention. Moreover, the debris can be cleared without the costly operation of launching a satellite or other platform into space. The lower fuel and energy costs could translate into a lower operating costs and quicker mission turnaround. In addition to clearing large debris objects, the invention can also be employed to clear very small particles of debris (such as paint chips and metal flakes) that present an untraceable threat to operating space vehicles and man space flight. The plume of gas can be configured to clear a relatively large targeted field or area of space without a need to track or identify the debris that needs to be cleared, and thus avoids the substantial and technologically-challenging problem of tracking and targeting of the large number of small items in the earth orbit. Embodiments of the invention are also environmentally-friendly because clearing the debris typically involves propelling into the orbit atmospheric gas with little or no orbital (i.e., horizontal) velocity, thereby reducing atmospheric expulsion.

BRIEF DESCRIPTION OF THE DRAWINGS

The foregoing and other objects and advantages of the invention will be appreciated more fully from the following further description thereof, with reference to the accompanying drawings. These depicted embodiments are to be understood as illustrative of the invention and not as limiting in any way.

DETAILED DESCRIPTION

To provide an overall understanding of the invention, certain illustrative embodiments will now be described, including systems and methods for clearing debris from an orbit. The systems and methods described herein will focus mainly on clearing debris from the so-called low-earth orbits (LEDs), that is, those orbits within the locus extending from the Earth's surface up to an altitude of about 1300 miles. However, it will be understood by one of ordinary skill in the art that the systems and methods described herein may be adapted and modified as is appropriate for other orbits, and that the systems and methods described herein may be employed in other suitable applications, and that such other additions and modifications will not depart from the scope hereof.

Figure 1:
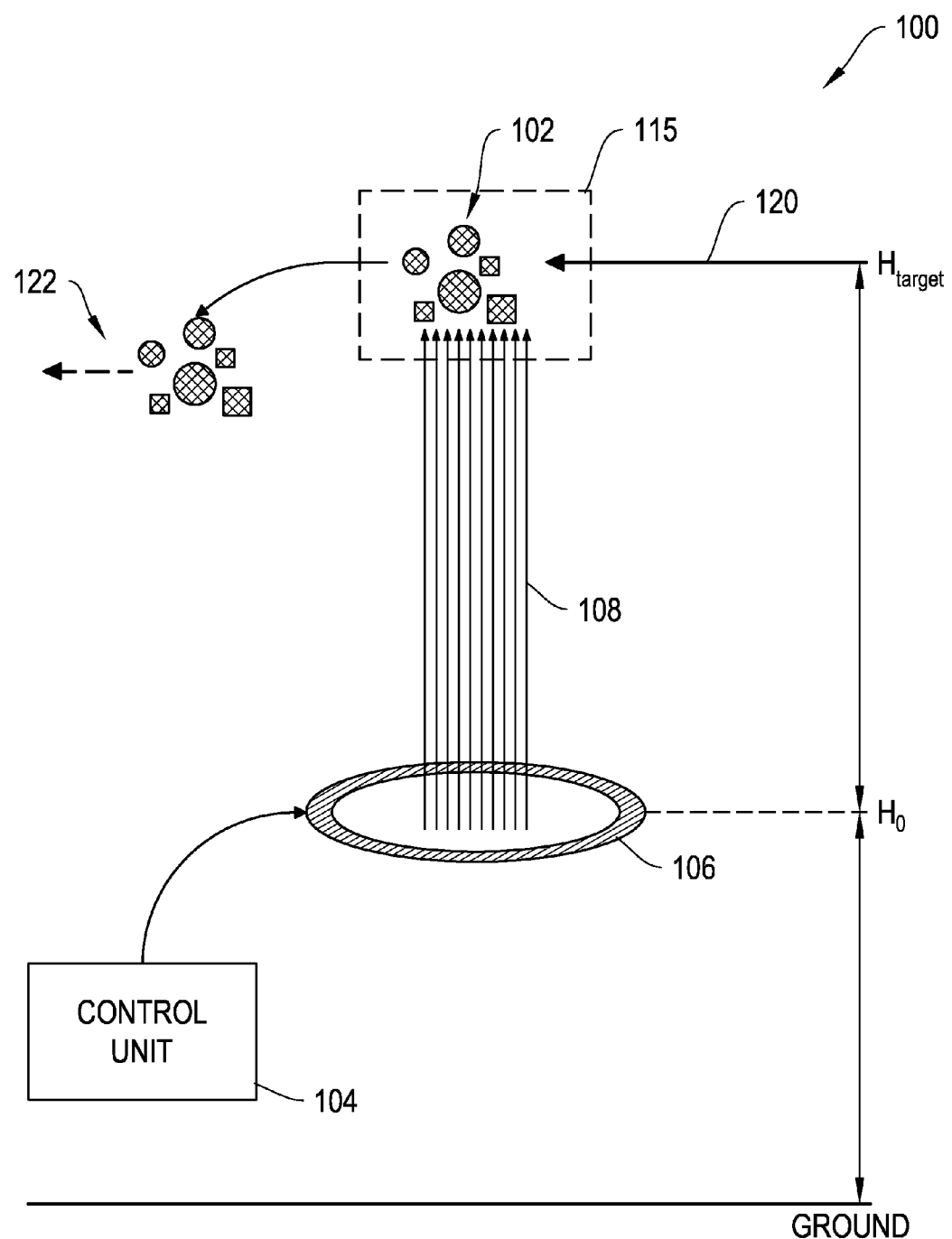
FIG. 1 shows a conceptual view of a debris-clearing system according to an illustrative embodiment of the invention.

FIG. 1 shows a conceptual view of a debris-clearing system 100 according to an illustrative embodiment of the invention. The embodiment of system 100 relies on an explosion of a shaped charge to propel a plume of gas into the path of debris in order to gradually decelerate the debris to the point of atmospheric recapture. FIG. 1 includes space debris 102 in debris field 115 orbiting the earth in an initial orbit 120. In this example, orbit 120 is a low-earth orbit. However, in other embodiments, the orbit 120 can be a mid-earth orbit or a geosynchronous orbit. The debris 102 can include by-products of space activities (such as spent spacecraft and fragments from spacecrafts) as well as naturally occurring elements, such as ice and rocks. The debris-clearing system 100 is particularly suitable for clearing untraceable small-sized debris (typically having a diameter of 10 cm or less) but can also but used to clear traceable large-sized debris. In the illustrative embodiment in FIG. 1, the system 100 can be configured to clear some or all the debris in a debris field 115. Some or all of the debris 102 can be cleared from the orbit 120 using the systems and methods according to embodiments of the invention.

In the illustrative embodiment in system 100, clearing the space debris 102 includes propelling a plume 108 of atmospheric gases substantially orthogonally into the orbiting path 120 of the debris. The injection of the plume into the path of the debris increases the amount of atmospheric particles obstructing the propagation of the debris and thereby causes a decrease in the forward velocity the debris. Because the altitude of sustained orbit for the debris is linked to the velocity of the debris, this reduction in velocity can trigger a downward spiral in the orbiting altitude of the debris, and eventually lead to atmospheric recapture of the debris. A control unit 104 includes a dispersing device, such as an aircraft, for dispersing a gaseous explosive to form a shaped charge 106 for generating and directing the gaseous plume 108. In one embodiment, the dispersing device of the control unit 104 disperses the gaseous explosive at a suborbital operational altitude, which, in appropriate cases, results in significant cost and energy savings when compared to a space-based launch. Dispersing the gaseous explosive at a suborbital altitude permits clearing of the debris without lofting the gaseous explosive into space and possibly generating additional debris in space. In an embodiment, the gaseous explosive includes a fuel-air explosive. In one embodiment, the gaseous explosive includes Hydrogen gas collected in the stratosphere using a solar-powered harvesting device that, for example, employs hydrolysis to extract the Hydrogen from water vapor, which is already present in the atmosphere.

As described above, the shaped charge 106 is formed at a suborbital operational altitude above ground, which is denoted herein as, $H_0$. The operational altitude $H_0$ is generally selected to minimize the effect of atmospheric drag on the plume 108 as it is propelled toward path 102. In typical embodiments, the operational altitude is about 20 to 25 miles above ground, although altitudes of 10 to 50 miles above ground are also possible for certain configurations and atmospheric conditions. Any suitable dispersing device, such as an aircraft, can be used to disperse the explosive charge in the desired shape at the operational altitude. The plume is propelled to a target altitude, $H_t$, which corresponds to the altitude of the target orbit from ground level. The distance between $H_t$ and $H_0$ is $\Delta H$, and corresponds to the displacement over which the plume is to be propelled. The energy, U, required to propel plume 106 through an altitude $\Delta H$ can be estimated using the potential difference equation as:

$$U = m \times g \times \Delta H$$

where m is the mass of the object to be propelled and g is the acceleration due to gravity, which is assumed to be 9.8 m/s² in these examples. Based on the equation above, assuming negligible atmospheric drag, to clear debris from an orbit at an altitude, $H_t$, of 400,000 ft (150 km) from an operational altitude of about 100,000 ft (33 km), and thus, $\Delta H$ of about 125 km, the potential energy required to propel the plume 108 having a mass of 25 kg is $25 \times 9.8 \times 125{,}000 = 3.0625 \times 10^7$ joules. Assuming a gaseous explosive comprised of a gasoline-based fuel-air mixture which can typically output $3.225 \times 10^7$ joules/liter, the 25 kg of plume can be propelled through an altitude of 125 km using about 1 liter of gasoline as the fuel portion of a fuel-air explosive.

The shaped charge 106 can take any suitable form, including, without limitation, a dome-shaped form having curved surface that faces away from the earth, a conical shaped form, or a donut-shaped ring. The size of the shaped charge 106 at its widest point can range from about one mile in diameter to several miles depending, for example, on the size of the debris field targeted, the size of the debris particles to be cleared, the target altitude, and the per-unit energy output of the explosive charge used. For debris in a LEO where the gravitational pull of the earth is relatively strong, the increased resistance from passing through the plume 108 generally causes the debris to gradually decelerate and eventually reenter the atmosphere.

In an embodiment, the debris 102 decays to a lower orbit 122 as a result of passing through the plume. It is understood that the plume 108 will affect different sizes and shapes of debris differently. For example, the plume will likely cause a larger deceleration of debris having a small mass than debris having a relatively large mass. Therefore, although FIG. 1 shows that the debris decays to a lower orbit 122, in practice, the debris is likely to decay to different lower orbits depending on the size of the debris, the shape of the debris, the initial orbit, the initial orbiting velocity, and the extent to which the path of the particular debris was obstructed by the gaseous particles in the plume.

Persons skilled in the art will recognize that the amount of gaseous particles required to create sufficient atmospheric obstruction in order to clear a given mass of debris will depend on the geometry and spacing of the debris objects. For example, a streamlined (e.g., a spherical) object would require more gaseous particles to create sufficient obstruction compared to an irregular object (e.g., paint flakes and small screws) of the same mass because the former would produce less drag as it passes through the plume than the latter. In some implementations, the plume 108 can be configured to cause atmospheric recapture of the debris 102 in a LEO in about one month from application of the plume 108. Longer recapture times can be allowed for debris in higher altitudes, or alternatively, more fuel can be expended in propelling the plume or to increase the amount of gaseous particles propelled to the higher orbit in order to maintain the same recapture periods for debris in higher altitudes.

Figure 2A:
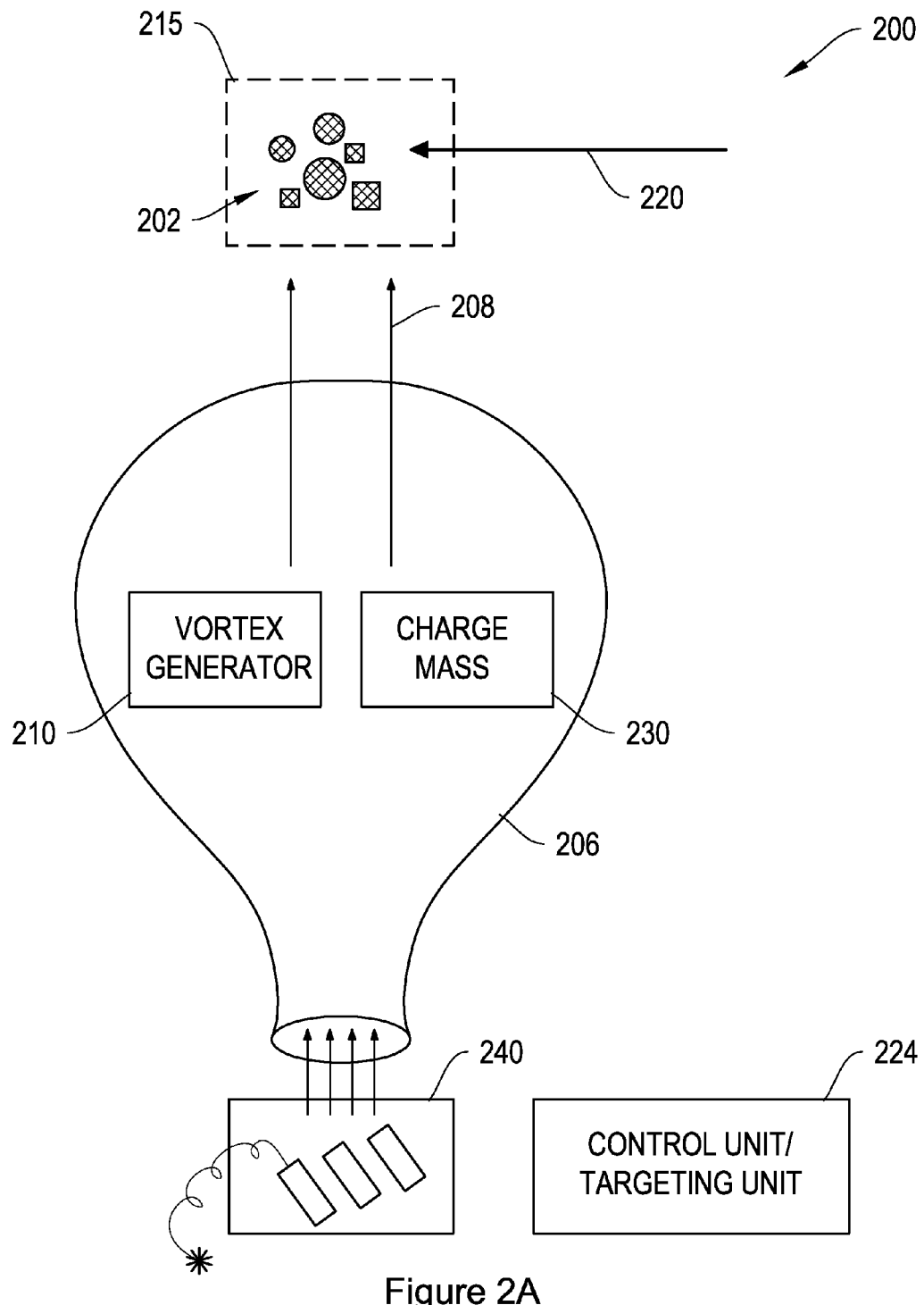
FIG. 2A shows a conceptual diagram of a debris-clearing system according to an aspect of the invention.

FIG. 2A shows a conceptual diagram of a debris-clearing system 200 according to aspects of the invention. In the embodiment of system 200, a the rapid expansion of atmospheric gases caused by a localized explosion (as opposed to an expansive explosion described in relation to FIG. 1) drives a volume of air through an appropriately shaped structure, thereby creating a vortex, which propels a gaseous plume into the path of space debris. Debris-clearing system 200 includes a floating platform 206 for transporting and/or maintaining at an operational altitude a vortex generator 210 for generating a vortex to clear debris from an orbit. In FIG. 2A, the floating platform 206 is a high-altitude balloon. The balloon's altitude can be maintained by helium, or by hydrogen collected by hydrolysis from the atmosphere. Currently, such balloons currently operate in the 20-25 mile range and can carry payloads on the order of a thousand pounds or more.

In one embodiment, the payload of the balloon 206 includes a vortex generator 210 and a charge mass 230. The vortex generator 210 can be activated by initiating an explosion of the charge mass 230 under an appropriately shaped structure mounted on, formed in, or otherwise supported by the floating platform 256. The rapid expansion of gas resulting from the explosion forces a volume of atmospheric gasses through the structure to create a vortex 208 for sending the atmospheric gas particles into the path 220 of the debris 202 or the debris field 215. In an embodiment, the explosion of the charge mass is controlled by a trigger 240 attached to the balloon 206. In an embodiment, the conical shape of the lower portion of the balloon itself serves as the vortex generator, and the charge mass 230 is positioned directly below the bottom of the balloon 206. Initiation of the charge mass 230 forces a volume of air through the balloon 206, generating the vortex as the air blasts through the top of the balloon 206 towards the debris or debris field.

The balloon 206 can be controlled by control/targeting unit 224 to ensure that the plume is directed substantially orthogonally to the path 220. Although the control unit 224 is shown as being external to the balloon 206 (e.g., communicating wirelessly with the balloon), in some embodiments, the control unit 224 controls the balloon 206 from within the balloon 206. The balloon can be launched at an operational altitude of about 615 feet, and can rise to about 120,000 feet (that is, about 22 miles) where the vortex is generated.

Figure 2B:
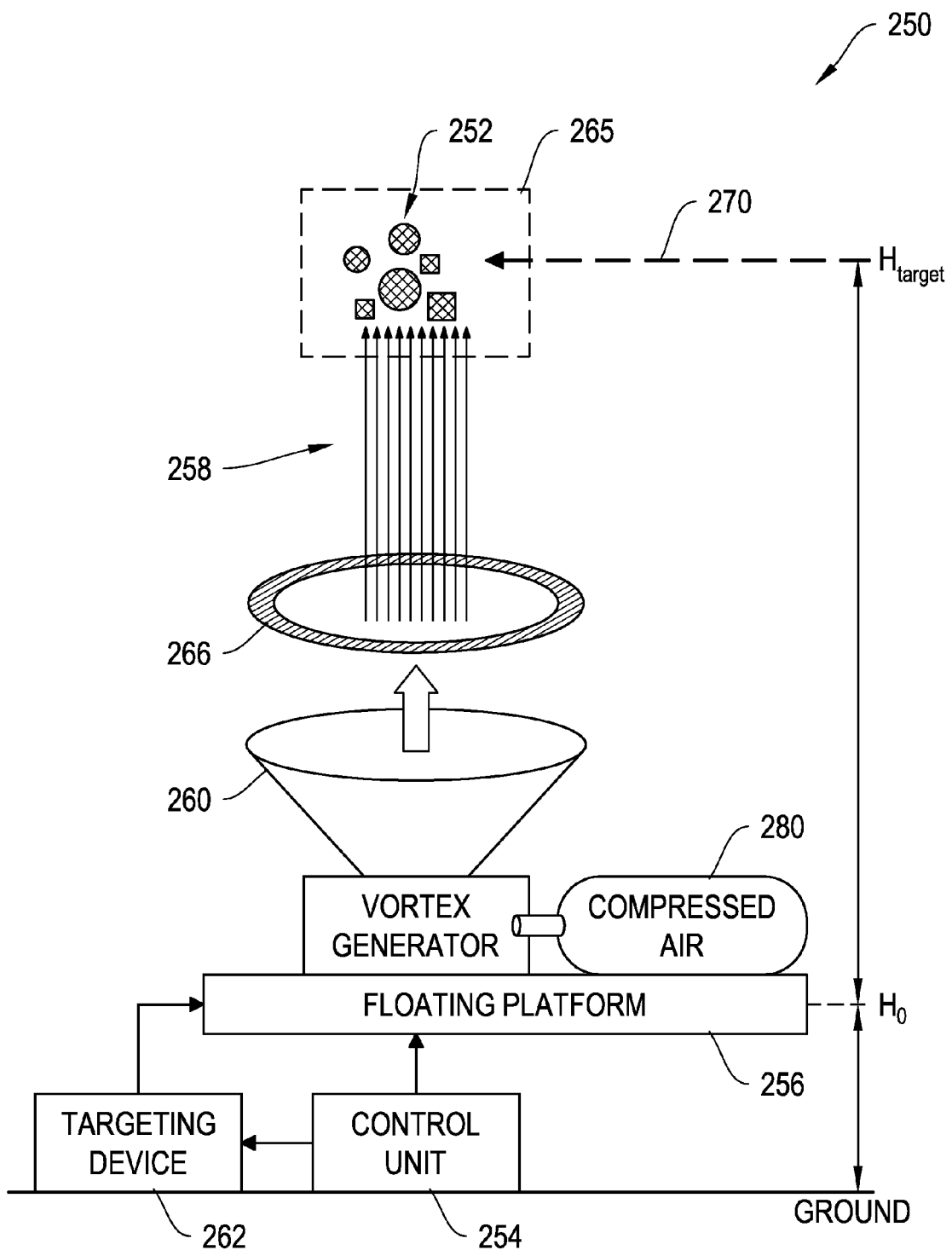
FIG. 2B shows a conceptual diagram of the debris-clearing system according to an aspect of the invention.

FIG. 2B shows another conceptual diagram of a debris-clearing system 250 according to an aspect of the invention. Like systems 100 and 200, system 250 also propels atmospheric gases orthogonal or substantially orthogonal to the orbital path of debris in order to clear the debris. According to one aspect of the invention, the embodiment of system 250 creates a vortex by propelling compressed air through an opening in an appropriately-shaped form (such as an open-ended cone) in order to generate and propel a gaseous plume into the path of the space debris.

System 250 includes a control unit 254 for configuring various aspects of the system, including the placement of the vortex generator 260, the amount of compressed air 280 to be propelled, the operational altitude $H_0$, etc. The control unit 254 can include one or more processors, data storage units, etc., for configuring the various aspects of system 250. For example, the control unit 254 can include various modules for managing debris in space, such as modules for tracking the debris density in portions of an orbit, determining the particle size of debris to be cleared, tracking debris velocities and locations, and configuring some or all aspects of system 250 in order to clear the debris. In some embodiments, the control unit 254 is also configured to retrieve the floating platform after operating the system 250 in a manner which does not result in the creation of additional debris. For example, the floating platform can be configured to return to the launch station after generating the gaseous plume. Although control unit 254 is shown as a single unit, certain embodiments may include multiple control units 254. The floating platform 256 can be any suitable device for transporting and/or maintaining the vortex generator 260 at the desired operational altitude, such as for example, a high altitude balloon. The operational altitude can be selected based on considerations similar to that described in relation to FIG. 1, taking into account the payload capacity and operational regime of the particular floating platform 256 employed.

The vortex generator 210 can be any aerodynamic surface having a vane, bump, or opening that directs fluid, such as air, to create a vortex when the fluid passes through. In an embodiment, the aerodynamic surface includes a conical shape having a space-facing opening and an earth-facing opening, and oriented such that the space-facing opening has a larger diameter than the earth-facing diameter. The vortex generator 210 can be activated by directing compressed air collected from the atmosphere through the generator. In an embodiment, the vortex generator 210 is a high-powered vortex ring gun, such as a vortex generator in which the initial discharge of the gaseous particles from the generator is shaped by an explosion.

System 250 also includes targeting device 262 for aiming the vortex generator 210 such that the plume generated by the vortex is orthogonally or substantially orthogonally to the path of debris 252 or a debris field 265. When activated, the vortex generator emits a vortex ring 266 for directing a plume 258 of compressed air into the path 270 of the debris. As described in more detail below, depending on the configuration, the vortex generator 260 can propel the gaseous plume 258 to penetrate the mesosphere and enter the stratosphere to clear debris therein. In the embodiment of system 250, the plume 258 is configured to clear the debris 252 from a debris field 265. The debris field 265 can include known and unknown debris, which can be trackable or non-trackable. However, the system 250 can also be configured to target specific debris particles 252, rather than a debris field, using the targeting device 262.

In specific implementations, the vortex generator is activated with sufficient air (for an embodiment that utilizes compressed air) or explosives (for an embodiment that uses a shaped explosion) such that the vortex is capable of sustained vertical propagation sufficient to transport the gaseous particles to at least a target altitude corresponding the orbit of the debris. In one example, the vortex is propelled with an initial velocity $v_0$ that is estimated based on the target vertical distance $H_t$ which the vortex travels in order to place the gaseous particles in the path of the debris. For example, the upward velocity of the vortex at time t can be estimated as:

$$v(t)=v_0+(-g)t$$

where g is the gravitational pull of the earth. The vertical displacement H at time t can be derived by integration as:

$$H(t) = v_0 t - \frac{1}{2} g t^2$$

Assuming that the vertical velocity at the target height, $H_t$, is 0 and combining the foregoing two equations, the target height $H_t$ attained by the plume having an initial velocity $v_0$ can be estimated as:

$$H_t = \frac{1}{2}\frac{v_0^2}{g}$$

Thus, the initial velocity $v_0=\sqrt{H_t \times g \times 2}$. Assuming the gravitational pull g to be 9.8 $m/s^2$ in these examples, the table below shows illustrative target heights and corresponding initial velocities.

TABLE 1

Illustrative target heights and corresponding initial velocities

| Max Height ($H_t$) km | Initial Velocity ($v_0$) m/sec |
|---|---|
| 800 | 3959.79 |
| 300 | 2424.87 |
| 150 | 1714.64 |
| 125 (LEO) | 1565.24 |

For simplicity and ease of description, the foregoing calculation does not take into account various physically-occurring phenomena that may affect vertical propagation of the vortex, such as air temperature, variations in gravitational force, variations in air density, etc. However, persons skilled in the art will recognize that the foregoing estimates for the initial velocity required to propel the vortex to a target height are conservative because reductions in opposing gravitational pull at higher altitudes will reduce the initial velocity required to attain the target height, or alternatively, cause the vortex to propagate beyond the target height for the stated initial velocities. In the exemplary calculations above, the effects of atmospheric drag on the vertical propagation of the vortex is ignored as such effects would be minimal for several reasons. First, because drag is directly proportional to fluid density, which decreases with increasing altitude, the operational height $H_0$ can be selected to minimize drag effects on the vortex. Second, as the vortex propagates through the relatively static air, losses in rotational velocity of the vortex due to drag effects will be converted to an upward acceleration of the mass of air.

In certain implementations, in order for the air particles to slow down debris upon reaching the target orbit, it is sufficient to produce just enough atmospheric obstruction of the orbiting debris in order destabilize the debris and lead to decay. As noted above, because the orbit of the debris is intimately linked to its orbiting velocity, even a small decrease in velocity can trigger decay to a lower orbit and subsequent atmospheric re-entry. For example, 1 gram of spherical debris object having a cross-sectional area of 1 centimeter-squared (i.e., $10^{-4}$ m$^2$) and traveling at about 8000 m/s in the LEO can be destabilized into decay by reducing the velocity to about 7800 m/s (i.e., a reduction of 200 m/s). Assume that the air mass at the point of impact is a perfect sphere (for worst case conditions), and that the drag coefficient of the debris is 1. The drag force $F_D$ opposing the debris as a result of the gaseous particles can be estimated using the drag equation as follows:

$$F_D = \frac{1}{2}\rho u^2 C_D A$$

where $\rho$ is the mass density of the fluid (air), assumed to be $1.8 \times 10^{-4}$ kg/m$^3$ at the target altitude $H_t$, u is the velocity of the debris object relative to the surrounding fluid, A is the reference area, which is the same as the cross-sectional area for a spherical object, and $C_D$ is the drag coefficient of the object, assumed to be 1 in this example.

Based on the above-stated assumptions, the drag force opposing the forward propagation of the debris object is approximately $$F_D = \frac{1}{2}(1.8 \times 10^{-4})(8000)^2(1)(10^{-4}) = 0.576 \text{ mkg/s}^2$$

The duration of exposure, t, required to slow down the debris object by 200 m/s given the drag force calculations above can be estimated based on a generic force equation as $$t = \frac{mv}{F_D},$$

where m is the mass of the debris object assumed to be $10^{-3}$ kg and v is the desired change in velocity assumed to be 200 m/s. Applying these numbers, $$t = \frac{10^{-3} * 200}{0.576} = 0.35 \text{ s}$$

Thus, in order to slow the debris object of this example by 200 m/s, the plume would have a diameter of approximately the distance that the object would travel at the original velocity of 8000 m/s, that is 0.35 s×8000 m/s=2.8 km. In some implementations, the gaseous plume can be injected in multiple shots, as opposed to a single shot to achieve the desired destabilization. For example, in the foregoing example, the debris object can be obstructed at four points using a gaseous plume having a diameter of about 700 m. The foregoing example is intended merely to demonstrate generally one mechanism for configuring a plume in order to slow down debris in an exemplary orbit. Other calculations and estimation mechanisms may be used without deviating from the principles of the embodiments described herein.

Figure 3:
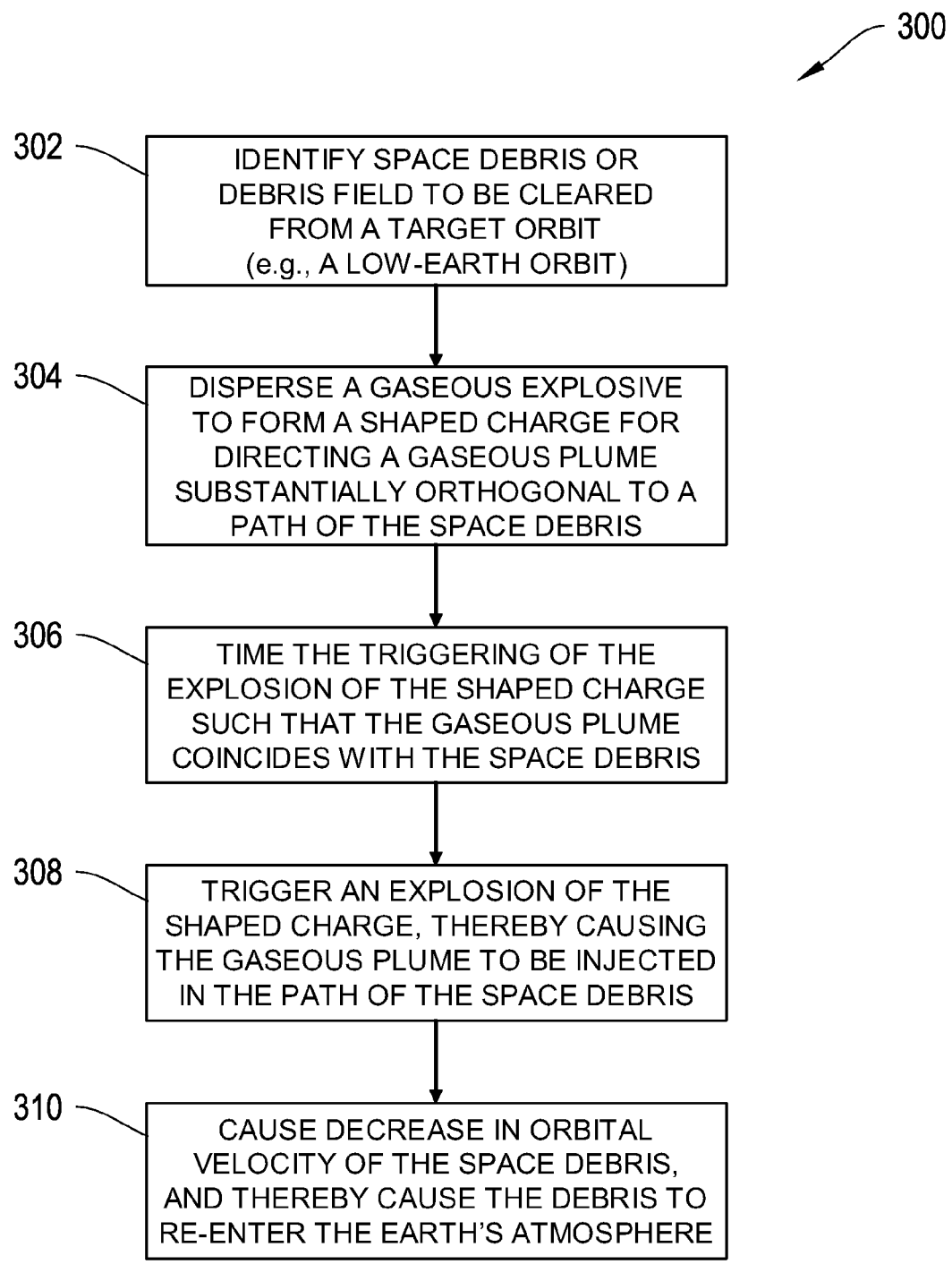
FIG. 3 shows an illustrative flow chart for a process for clearing space debris according to embodiments of the invention.

FIG. 3 shows process 300 for clearing debris in an orbit according to embodiments of the invention. In particular, the embodiment described in process 300 relies on an explosion of a shaped charge to propel a plume of gas into the path of debris in order to decelerate the debris to gradually decay its orbit to the point of atmospheric recapture. At step 302, a control unit 104 identifies space debris 102 or a debris field 115 to be cleared from a target orbit (e.g., a low-earth orbit). The control unit 104 can identify the debris using any of a number of known techniques for measuring the debris density in an orbit. For example, the U.S. Strategic Command maintains a catalogue containing about several thousand debris particles in space using observation data gathered by a number of ground-based radar facilities and telescopes as well as by a space-based telescope. Unobserved debris (e.g., debris particles that are too small to be reliably tracked by known methods) can also be cleared by targeting a debris field that is likely to be populated by such objects. Other sources of knowledge on the actual space debris environment, such as measurements obtained by measurement campaigns such as the ESA Space Debris Telescope can also be used.

At step 304, a dispersing device (e.g., an aircraft) disperses a gaseous explosive to form a shaped charge 106 for directing a gaseous plume substantially orthogonal to a path of the space debris. At step 306, a timing unit of control unit 104 times a trigger that controls an explosion of the shaped charge such that explosion of the shaped charge 106 will generate a gaseous plume in the path of the debris. In one embodiment, explosion is timed such that the debris collides with the gaseous plume when the plume has reached its apex, thereby limiting or eliminating an upward vertical forces being applied to the space debris by the plume. At step 308, a triggering device (e.g., a triggering device in control unit 104) triggers an explosion of the shaped charge, thereby causing the gaseous plume 108 to be injected in the path of the space debris. The air is propelled in the plume so that the gaseous particles of the plume remain in the upper atmosphere of the debris for only a finite period of time, thereafter returning to the lower atmosphere, such that the impact of the plume on non-space debris objects in LEO is reduced or eliminated. At step 310, injection of the plume 108 into the path causes a decrease in orbital velocity of the space debris, and thereby causes the debris to re-enter the earth's atmosphere as a result of coinciding with the gaseous plume.

Figure 4:
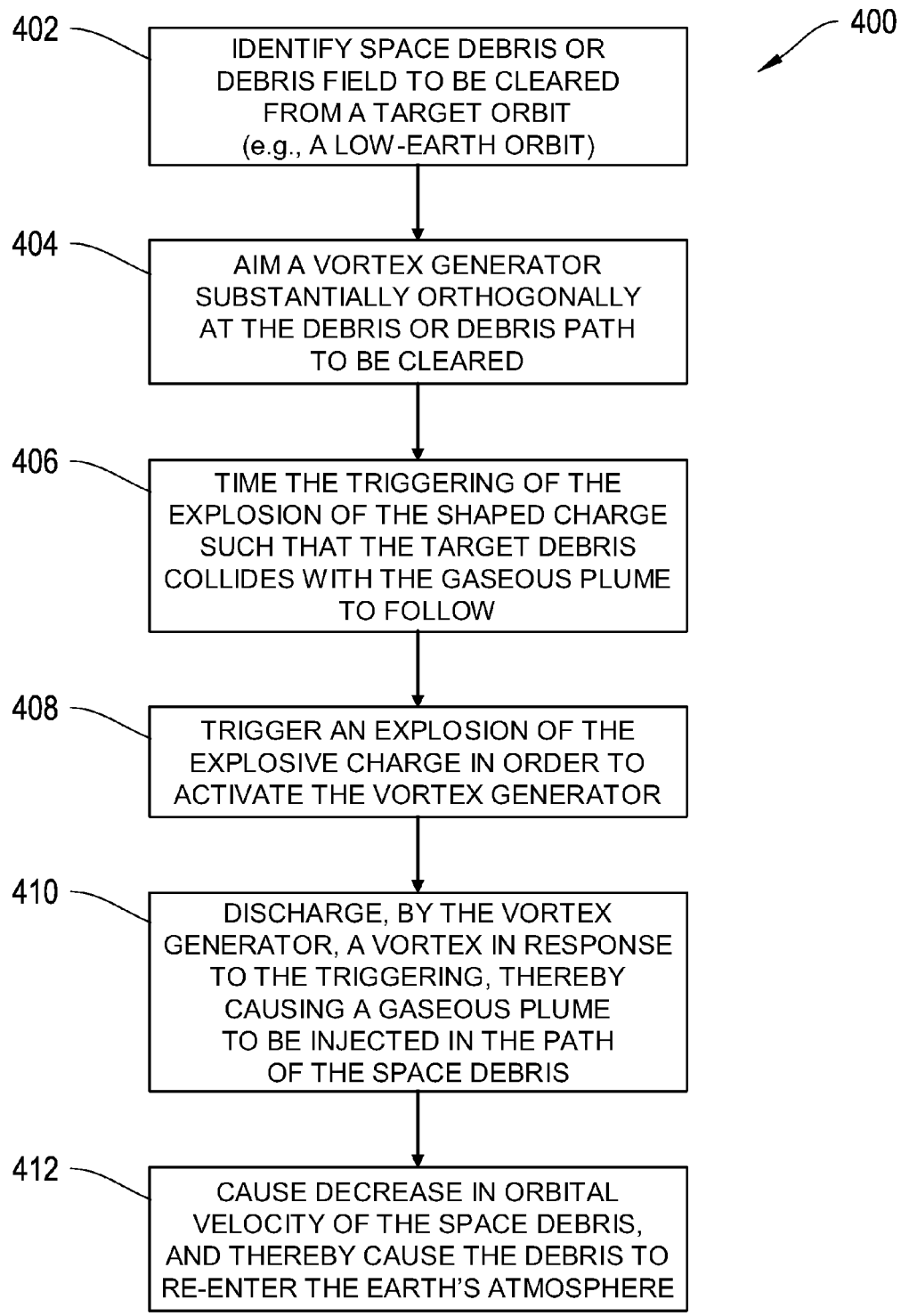
FIG. 4 shows an illustrative flow chart for a process for clearing space debris according to embodiments of the invention.

FIG. 4 shows an illustrative flow chart for a process 400 for clearing space debris according to embodiments of the invention. The embodiment described in process 400 creates a vortex for propelling the gaseous plume into the path of the debris. The vortex can be created by directing compressed air through a vortex generator 256 or by an explosion of a charge mass beneath an appropriately-shaped structure 206. At step 402, a control unit 204 or 254 identifies space debris or a debris field to be cleared from a target orbit (e.g., a low-earth orbit). Similar to process 300, the control unit can identify the debris using any of a number of known techniques for measuring the debris density in an orbit. At step 404, targeting device 224 or 262 aims a vortex generator such that a vortex generated by the vortex generator propels a gaseous plume substantially orthogonally to the debris path to be cleared. At step 406, a timing unit in control unit 204 or 254 can time a trigger of the vortex generator such that the target debris collides with a gaseous plume created by the vortex generator. At step 408, a triggering device (e.g., in control unit 224 or 254) fires the vortex generator by directing compressed air through the vortex generator 256, or by initiating an explosion beneath an appropriately-shaped structure 206. At step 410, the vortex generator discharges a vortex in response to the triggering, thereby causing a gaseous plume to be injected in the path of the space debris. At step 412, the debris collides with the gaseous particles from the gaseous plume and causes a decrease in orbital velocity of the space debris in order to expedite atmospheric capture or recapture of the debris.

The invention may be embodied in other specific forms without departing from the spirit or essential characteristics thereof. The foregoing embodiments are therefore to be considered in all respects illustrative, rather than limiting of the invention.

What is claimed is:

1. A system for clearing space debris from an earth orbit, the system comprising:

a vortex generator for propelling a vortex of gaseous plume into a path of space debris, thereby causing the gaseous plume to be injected in the path of the space debris to clear the space debris;

a floating platform for maintaining the vortex generator at a sub-orbital altitude above ground, wherein the vortex generator propels the gaseous plume into the path of space debris while the floating platform maintains the vortex generator at the sub-orbital altitude; and a targeting device for aiming the vortex generator substantially orthogonally to the path of the space debris.

2. The system of claim 1, wherein the floating platform comprises a balloon.

3. The system of claim 1, wherein the altitude ranges from about 10 to about 50 miles above ground.

4. The system of claim 1, wherein the altitude ranges from about 20 to about 25 miles above ground.

5. The system of claim 1, wherein the vortex generator comprises a high-powered vortex ring gun.

6. The system of claim 1, wherein the vortex generator causes the gaseous plume to penetrate the mesosphere and enter into the thermosphere.

7. The system of claim 1, wherein the vortex generator is configured to propel the vortex by triggering an explosion of a first explosive charge.

8. The system of claim 7, wherein the floating platform is configured to lift the first explosive charge to a suborbital altitude, and the vortex generator is configured to propel the vortex from the sub-orbital altitude.

9. The system of claim 1, further comprising a control unit for determining an orbital path of the space debris to be cleared.

* * * * *